United States Patent
Yoshika et al.

(10) Patent No.: US 8,326,299 B2
(45) Date of Patent: Dec. 4, 2012

(54) WIRELESS BASE STATION AND AUTOMATIC NETWORKING METHOD

(75) Inventors: Yasuhiro Yoshika, Kawasaki (JP); Mitsuru Nakatsuji, Kawasaki (JP); Kenichi Kamei, Kawasaki (JP); Atsushi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/079,928

(22) Filed: Apr. 5, 2011

(65) Prior Publication Data

US 2011/0237298 A1  Sep. 29, 2011

Related U.S. Application Data

(63) Continuation of application No. PCT/JP2008/068370, filed on Oct. 9, 2008.

(51) Int. Cl.
H04W 88/08 (2009.01)
(52) U.S. Cl. .............. 455/435.2; 455/561; 370/338
(58) Field of Classification Search .............. 455/435.2, 455/561; 370/338
See application file for complete search history.

(56) References Cited

U.S. PATENT DOCUMENTS

| | | | |
|---|---|---|---|
| 6,370,135 B1* | 4/2002 | Gardner | 370/352 |
| 2008/0298275 A1* | 12/2008 | De Sousa | 370/255 |
| 2010/0255848 A1* | 10/2010 | Abraham et al. | 455/446 |
| 2011/0086636 A1* | 4/2011 | Lin | 455/434 |
| 2011/0111745 A1* | 5/2011 | Li et al. | 455/422.1 |
| 2011/0237298 A1* | 9/2011 | Yoshika et al. | 455/561 |

FOREIGN PATENT DOCUMENTS

| | | |
|---|---|---|
| JP | 11215552 | 8/1999 |
| JP | 2006-261722 | 9/2006 |
| JP | 2006-324831 | 11/2006 |
| JP | 2007-266785 | 10/2007 |
| JP | 2008167491 | 7/2008 |

OTHER PUBLICATIONS

International Search Report dated Jan. 6, 2009, from corresponding International Application No. PCT/JP2008/068370.
3G TS 25.331 V3.2.0 3rd Generation Partnership Project; Technical Specification Group Radio Access Network; RRC Protocol Specification (Release 1999), Mar. 2000.
Japanese Office Action dated Oct. 2, 2012 from the corresponding Japanese Patent Application No. 2010-532740.

* cited by examiner

*Primary Examiner* — William D Cumming
(74) *Attorney, Agent, or Firm* — Katten Muchin Rosenman LLP

(57) ABSTRACT

In a wireless base station, an installation information transmitter of the wireless base station transmits installation information indicating that the wireless base station is being installed, to the wireless network controller via an existing wireless base station. A connection information receiver receives connection information for connecting to the wireless network controller via a public network, from the wireless network controller via the existing wireless base station. An installation information receiver of the wireless network controller receives the installation information from the wireless base station via the existing wireless base station. On receiving the installation information from the wireless base station, a connection information transmitter transmits the connection information to the wireless base station via the existing wireless base station.

8 Claims, 11 Drawing Sheets

| Message Type |
|---|
| Initial UE identity |
| Initial UE capability |
| Establishment cause |
| Protoco; error indicator(default FALSE) |
| Meaured results on RACH |

FIG. 7

F-BTS Establishment

Originating Speech Call

Originating CS Data Call

Originating PS Data Call

Terminating Speech Call

Terminating CS Data Call

Terminating PS Data Call

Emergency Call

Inter-system cell re-selection

Location Update(LAU & RAU)

IMSI Detach

SMS

Call re-establishment unspecified

FIG. 8

| Message Type |
|---|
| Initial UE identity |
| Rejection cause |
| Wait time |
| Redirection info |

FIG. 9

```
┌─────────────────┐
│  F-BTS+RNC ID   │
└─────────────────┘
``` congestion

Unspecified

FIG. 10

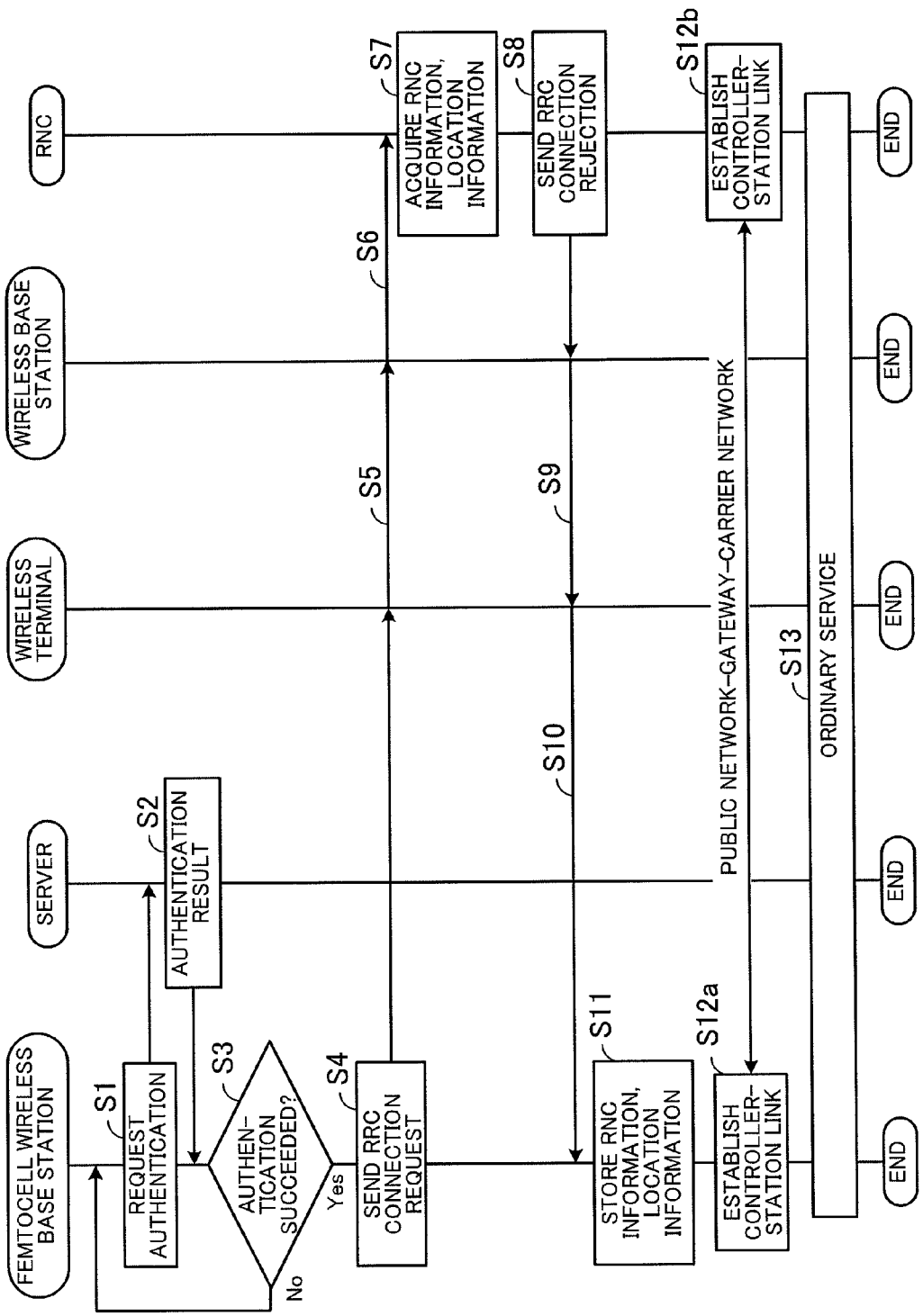

WIRELESS BASE STATION AND AUTOMATIC NETWORKING METHOD

This application is a continuing application, filed under 35 U.S.C. §111(a), of International Application PCT/JP2008/068370, filed on Oct. 9, 2008.

FIELD

The present invention relates to techniques for incorporating a wireless base station into a network.

BACKGROUND

With 3G (The 3rd Generation) systems, for example, it is possible to realize high-quality, stable telephone calls as well as high-speed wireless communication over a wide area (e.g., 3G TS25.331, V3.2.0 (2000-03)).

However, even in such wide-area, high-speed wireless communication as the one attained by the 3G system, the communication quality deteriorates if the distance between a wireless base station and a wireless terminal is long. Also, if radio waves are shared by a large number of wireless terminals, the communication speed lowers.

Thus, attention has been focused on femtocell wireless base stations as wireless base stations for covering areas where deterioration in the communication quality or lowering of the communication speed is liable to occur. The femtocell wireless base station is small in size, low in cost and capable of covering narrow-area wireless communication typified by indoor wireless communication.

Meanwhile, a networking system has hitherto been proposed which is configured to receive a networking request from a wireless base station, instruct a mobile communication terminal designated by the wireless base station to report the status of a downlink and, based on the downlink status reported from the mobile communication terminal, generate station data for networking (see Japanese Laid-open Patent Publication No. 2006-324831, for example).

Also, a small-sized base station device has been proposed which is configured to transmit information about its location to a spreading code management device, receive, from the spreading code management device, information about the spreading codes used by neighboring base stations, and assign to itself a spreading code not used by the neighboring base stations (see Japanese Laid-open Patent Publication No. 2007-266785, for example).

When installing a femtocell wireless base station, however, the user has to select a wireless network controller that is to control the femtocell wireless base station, posing the problem that the user needs to have a special knowledge and to follow a particular procedure.

SUMMARY

According to an aspect of the invention, a wireless base station to be incorporated into a wireless communication network via a public network, includes: an installation information transmitter configured to transmit, by means of wireless communication with an existing wireless base station, installation information indicating that the wireless base station is being installed, to a wireless network controller which controls the existing wireless base station; and a connection information receiver configured to receive connection information for connecting to the wireless network controller via the public network, from the wireless network controller by means of wireless communication with the existing wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an exemplary data structure of installation information;

FIG. 8 illustrates an Establishment cause code;

FIG. 9 illustrates an exemplary data structure of RNC information and location information;

FIG. 10 illustrates a Rejection cause code; and

FIG. 11 is a sequence diagram illustrating processes of the communication network.

DESCRIPTION OF EMBODIMENT

Figure 1:
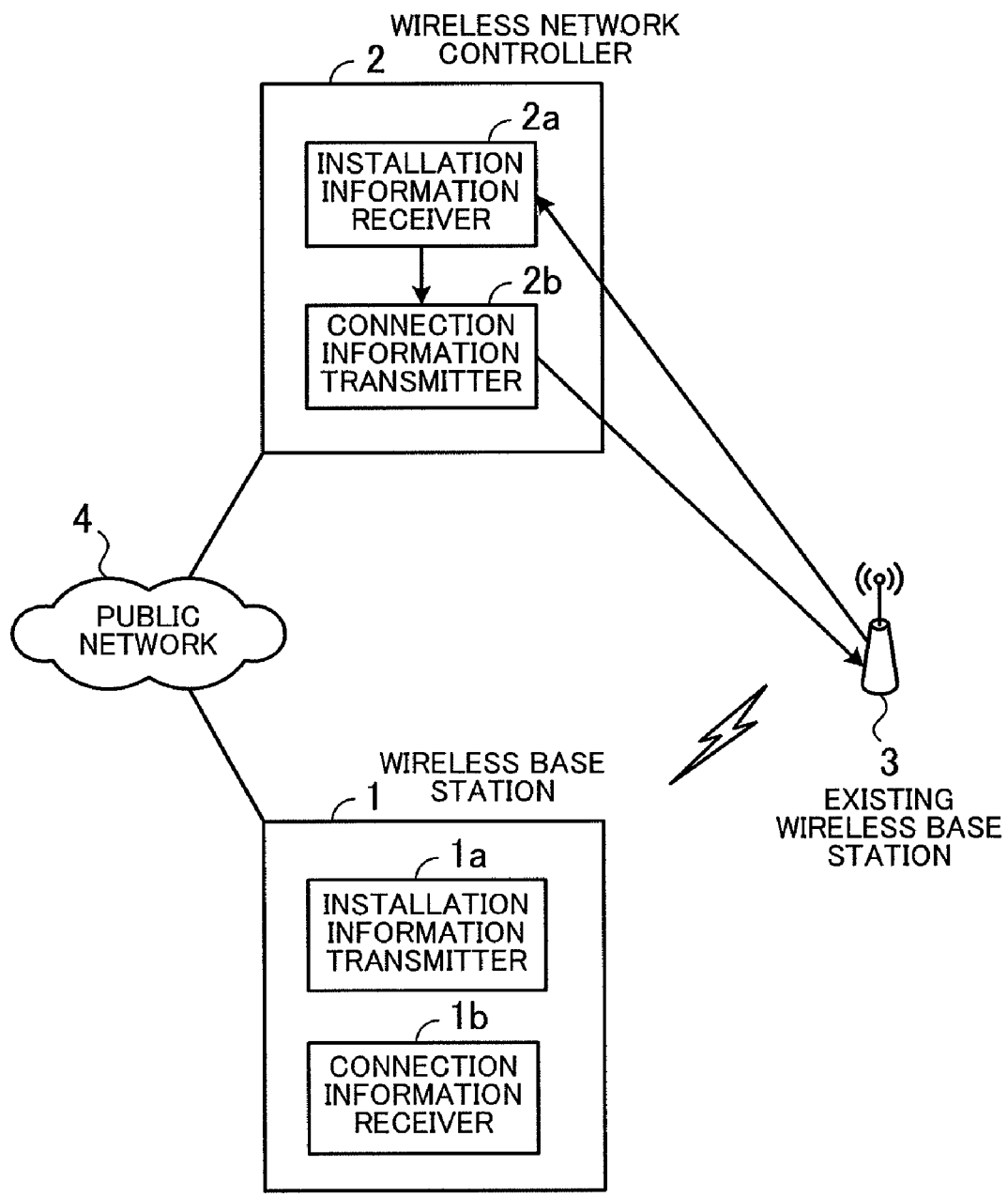
FIG. 1 illustrates a wireless base station and a wireless network controller.

FIG. 1 illustrates a wireless base station and a wireless network controller. As illustrated in FIG. 1, the wireless network controller 2 is connected with an existing wireless base station 3 already installed, and is also connected to a public network 4 such as the Internet. A wireless base station 1 is, for example, a femtocell wireless base station and is incorporated into a wireless communication network via the public network 4.

The wireless base station 1 comprises an installation information transmitter 1a and a connection information receiver 1b. When the wireless base station 1 is connected to the public network 4 by the user who purchased the wireless base station 1, for example, the installation information transmitter 1a transmits, by means of wireless communication with the existing wireless base station 3, installation information indicating that the wireless base station 1 is being installed, to the wireless network controller 2 which controls the existing wireless base station 3.

The connection information receiver 1b receives connection information for connecting to the wireless network controller 2 via the public network 4, from the wireless network controller 2 by means of wireless communication with the existing wireless base station 3.

The wireless network controller 2 comprises an installation information receiver 2a and a connection information transmitter 2b. The installation information receiver 2a receives, from the existing wireless base station 3, the installation information indicating the installation of the wireless base station 1, the installation information being transmitted by means of wireless communication from the wireless base station 1 to the existing wireless base station 3.

In response to the reception of the installation information by the installation information receiver 2a, the connection information transmitter 2b transmits the connection information for connecting to the wireless network controller 2 via the public network 4, to the wireless base station 1 via the existing wireless base station 3.

Operation of the system illustrated in FIG. 1 will be now described. Let it be assumed that the user who purchased the wireless base station 1 connects the wireless base station 1 to the public network 4, in order to have the wireless base station 1 incorporated into the wireless communication network. In this case, the installation information transmitter 1a of the wireless base station 1 transmits the installation information indicating that the wireless base station 1 is being installed, to the wireless network controller 2 via the existing wireless base station 3.

When the installation information from the wireless base station 1 is received by the installation information receiver 2a of the wireless network controller 2, the connection information transmitter 2b transmits, via the existing wireless base station 3, the connection information for connecting to the wireless network controller 2. The connection information receiver 1b of the wireless base station 1 receives, via the existing wireless base station 3, the connection information for connecting to the wireless network controller 2.

Based on the connection information transmitted from the wireless network controller 2, the wireless base station 1 can connect to the wireless network controller 2 which is to control the wireless base station 1. Also, the wireless base station 1 can establish a station-controller link with the wireless network controller 2. Namely, the wireless base station 1 can automatically select the wireless network controller 2 which is to control the wireless base station 1, so as to be incorporated into the wireless communication network.

In this manner, the wireless base station 1 transmits the installation information to the wireless network controller 2 via the existing wireless base station 3. On receiving the installation information, the wireless network controller 2 transmits the connection information to the wireless base station 1 via the existing wireless base station 3. Thus, based on the received connection information, the wireless base station 1 can automatically connect, via the public network 4, to the wireless network controller 2 which is to control the wireless base station 1.

An embodiment will be now described in detail with reference to the drawings.

Figure 2:
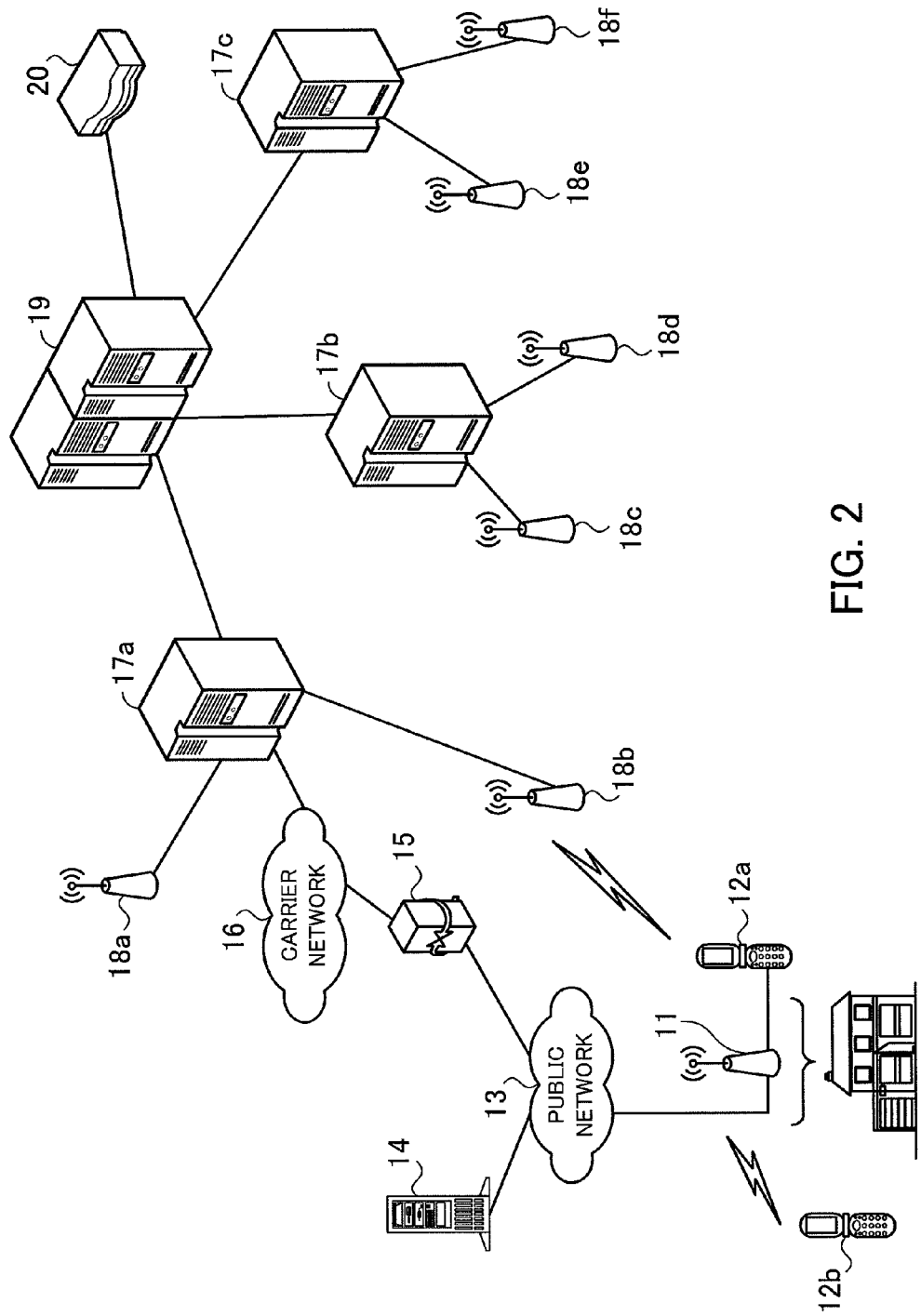
FIG. 2 illustrates an exemplary configuration of a communication network to which a femtocell wireless base station is applied.

FIG. 2 illustrates an exemplary configuration of a communication network to which a femtocell wireless base station is applied. As illustrated in FIG. 2, a femtocell wireless base station 11 is connected to a public network 13. The public network 13 is, for example, an IP (Internet Protocol) network such as the Internet.

The femtocell wireless base station 11 is privately installed, for example, at home or in an office by an individual or a business enterprise. The femtocell wireless base station 11 is capable of communicating wirelessly with a wireless terminal 12b that exists within a femtocell having a radius of several tens of meters.

Also, the femtocell wireless base station 11 is connected with a wireless terminal 12a by a cable. The femtocell wireless base station 11 is capable of wirelessly communicating, via the wireless terminal 12a, with wireless base stations which cover the wireless communication of the wireless terminal (of which the range of communication covers the location where the wireless terminal is situated). Let us suppose, for example, that the wireless terminal 12a belongs to the cell of the wireless base station 18b. In this case, the femtocell wireless base station 11 can wirelessly communicate with the wireless base station 18b via the wireless terminal 12a. The wireless terminals 12a and 12b are, for example, mobile phones.

A server 14 is connected to the public network 13. Also, a gateway 15 is connected to the public network 13. The server 14 authenticates the femtocell wireless base station 11 when the user installs the femtocell wireless base station 11. The gateway 15 interconnects the public network 13 and a carrier network 16, and enables data to be exchanged between the public network 13 and the carrier network 16.

The carrier network 16 is a network provided by a wireless communication carrier, for example. An RNC (Radio Network Controller) 17a is connected to the carrier network 16. The RNCs 17a to 17c are connected with wireless base stations 18a to 18f. The RNCs 17a to 17c perform control operations on the wireless base stations 18a to 18f, such as radio resource management, line connection control, and handover control.

Further, the RNCs 17a to 17c are connected to an MMS (Multimedia Messaging Server) 19. The MMS 19 stores and processes multimedia messages such as text, images, sound, and video.

The MMS 19 is connected with an HLR (Home Location Register) 20. The HLR 20 manages information necessary for guaranteeing mobility of the wireless terminal 12b and providing service.

The carrier network 16, the RNCs 17a to 17c, the wireless base stations 18a to 18f, the MMS 19 and the HLR 20 constitute a wireless communication network. The wireless communication network adopts, for example, a 3G wireless communication scheme or the like.

In the communication network of FIG. 2, the femtocell wireless base station 11 is assumed to be installed at the user's home or the like. The user connects the femtocell wireless base station 11 to the public network 13 and connects the wireless terminal 12a to the femtocell wireless base station 11.

When connected to the public network 13, the femtocell wireless base station 11 accesses the server 14. The server 14 performs an authentication process to determine whether the femtocell wireless base station 11 may be installed or not, and transmits the authentication result to the femtocell wireless base station 11.

If the authentication result received from the server 14 indicates success in authentication, the femtocell wireless base station 11 communicates wirelessly, via the wireless terminal 12a, with the wireless base station 18b. Then, the femtocell wireless base station 11 transmits, via the wireless terminal 12a and the wireless base station 18b, installation information indicating that the femtocell wireless base station 11 is being installed, to the RNC 17a which controls the wireless base station 18b. Namely, the femtocell wireless base station 11 sends a notification of the installation thereof to the RNC 17a which is to control the femtocell wireless base station 11 being installed.

On receiving the installation information from the femtocell wireless base station 11, the RNC 17a transmits RNC information to the femtocell wireless base station 11. The RNC information includes information that is necessary for the femtocell wireless base station 11 to connect the RNC 17a via the public network 13, the gateway 15, and the carrier network 16. Such information includes, for example, identification information that is uniquely allocated to the RNC 17a. Based on the identifier of the RNC 17a, for example, the gateway 15 searches for the IP address of the RNC 17a to enable the femtocell wireless base station 11 to communicate with the RNC 17a. Alternatively, the IP address of the RNC 17a may be directly included in the RNC information.

Also, when the installation information is received, the RNC 17a specifies the location of the newly installed femtocell wireless base station 11, on the basis of the location of the wireless base station 18b that relayed the installation information. The RNC 17a transmits, to the femtocell wireless base station 11, location information indicating the specified location of the femtocell wireless base station 11.

On receiving the RNC information and the location information from the RNC 17a, the femtocell wireless base station 11 connects to the RNC 17a via a wired route of the public network 13, the gateway 15 and the carrier network 16, in accordance with the received RNC information. Then, the femtocell wireless base station 11 and the RNC 17a communicate with each other via the wired route of the public network 13, the gateway 15 and the carrier network 16 to establish a station-controller link.

The femtocell wireless base station 11 may be configured either to hold in advance a static IP address for accessing the gateway 15 or to receive the IP address of the gateway 15 from the server 14 along with the authentication result indicative of success in authentication.

In this manner, when the femtocell wireless base station 11 is newly installed by the user, the femtocell wireless base station 11 transmits, via the wireless terminal 12a, the installation information to the RNC 17a which is to control the femtocell wireless base station 11. On receiving the installation information from the femtocell wireless base station 11, the RNC 17a transmits the RNC information to the femtocell wireless base station 11. Thus, based on the RNC information received from the RNC 17a, the femtocell wireless base station 11 can connect to the RNC 17a via the public network 13, the gateway 15 and the carrier network 16.

Also, since the femtocell wireless base station 11 is authenticated by the server 14, it is possible to prevent inappropriate femtocell wireless base stations from being incorporated into the network.

Figure 3:
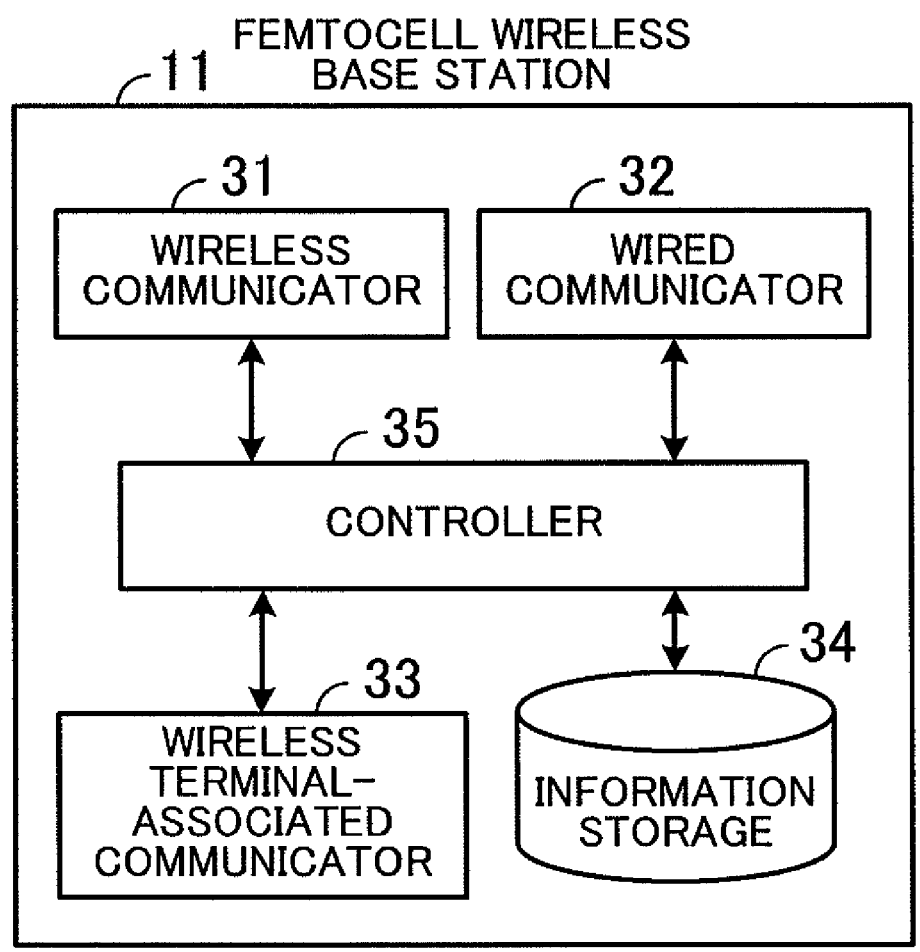
FIG. 3 is a block diagram of the femtocell wireless base station.

FIG. 3 is a block diagram of the femtocell wireless base station. As illustrated in FIG. 3, the femtocell wireless base station 11 comprises a wireless communicator 31, a wired communicator 32, a wireless terminal-associated communicator 33, an information storage 34, and a controller 35. For example, the wireless communicator 31, wired communicator 32, and wireless terminal-associated communicator 33 are realized by a DSP (Digital Signal Processor) or FPGA (Field Programmable Gate Array), and the controller 35 is realized by a CPU (Central Processing Unit).

The wireless communicator 31 communicates wirelessly with the wireless terminal 12b that exists within the femtocell. A wireless communication scheme to be employed may be WCDMA (Wideband Code Division Multiple Access), GSM (Global System for Mobile), EDGE (Enhanced Data rate for GSM Evolution), CDMA2001x, LTE (Long Term Evolution), or WiMAX (Worldwide Interoperability for Microwave Access), for example.

The wired communicator 32 accesses the facilities of a carrier such as an ISP (Internet Service Provider) to communicate with the server 14 or the RNC 17a via the public network 13. The wired communicator 32 may have an Ethernet (registered trade name)-based communication interface. Alternatively, the wired communicator 32 may be configured to communicate with the server 14 or the RNC 17a via a wireless LAN (Local Area Network).

The wireless terminal-associated communicator communicates with the wireless terminal 12a which is connected to the femtocell wireless base station 11 when the femtocell wireless base station 11 is being installed. In FIG. 2, the femtocell wireless base station 11 is connected with the wireless terminal 12a by a cable to communicate therewith, but the former may communicate wirelessly with the latter. For example, the wireless terminal-associated communicator 33 may communicate wirelessly with the wireless terminal 12a by RFID (Radio Frequency Identification), Bluetooth, infrared communication (IrDA), ZigBee (IEEE 802.15.4) or the like.

The information storage 34 stores the RNC information and location information sent from the RNCs 17a to 17c. The information storage 34 includes a memory.

When the femtocell wireless base station 11 is connected to the public network 13, the controller 35 accesses the server 14 through the wired communicator 32. After accessing the server 14, the controller 35 transmits, to the server 14, femtocell wireless base station-specific information stored beforehand in the memory or the like. The femtocell wireless base station-specific information includes authentication information such as the identifier of the femtocell wireless base station 11. On the basis of the authentication information, the server 14 authenticates the femtocell wireless base station 11.

The controller 35 receives the authentication result from the server 14 through the wired communicator 32. If the received authentication result indicates success in authentication, the controller 35 communicates with the wireless terminal 12a through the wireless terminal-associated communicator 33 and controls the wireless terminal 12a so as to communicate with the wireless base station 18b that covers the wireless communication of the wireless terminal 12a (femtocell wireless base station 11). Then, the controller 35 transmits, via the wireless terminal 12a and the wireless base station 18b, the installation information about the installation of the femtocell wireless base station 11 to the RNC 17a which controls the wireless base station 18b.

Subsequently, the controller 35 receives, via the wireless base station 18b and the wireless terminal 12a, the RNC information and the location information from the RNC 17a which is to control the femtocell wireless base station 11. On receiving the RNC information and the location information from the RNC 17a, the controller 35 stores the received information in the information storage 34.

After storing the RNC information and the location information in the information storage 34, the controller 35 accesses, in accordance with the stored RNC information, the RNC 17a via the public network 13, the gateway 15 and the carrier network 16 to establish a station-controller link.

Figure 4:
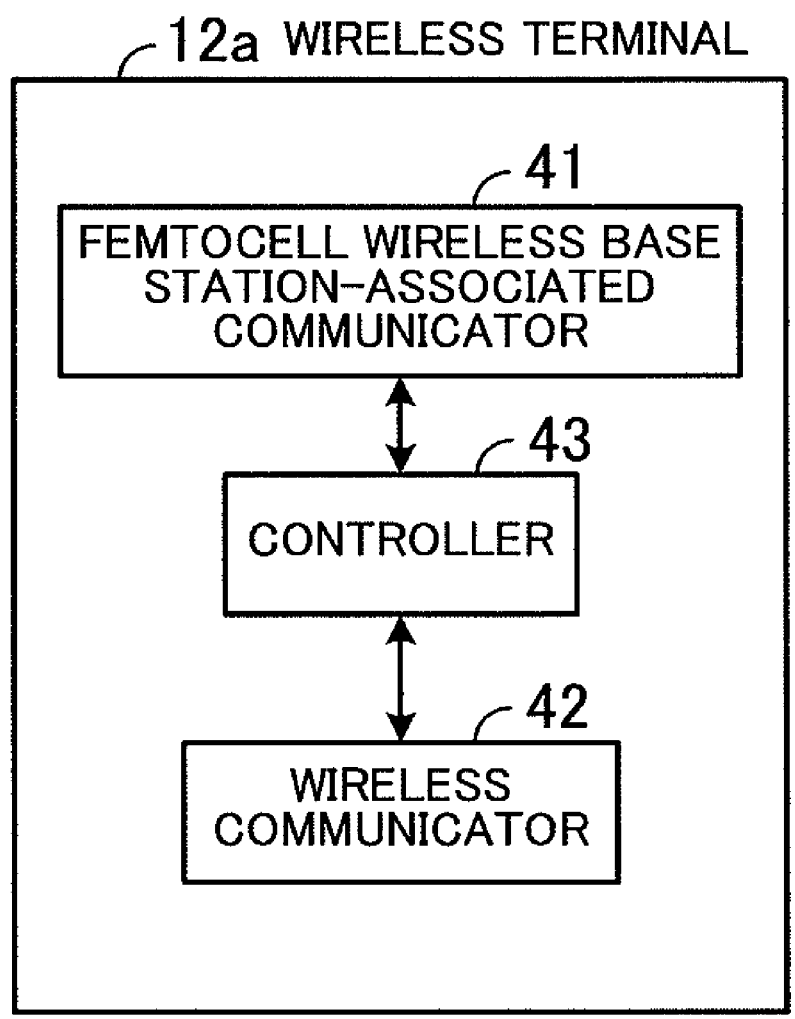
FIG. 4 is a block diagram of a wireless terminal.

FIG. 4 is a block diagram of the wireless terminal. As illustrated in FIG. 4, the wireless terminal 12a comprises a femtocell wireless base station-associated communicator 41, a wireless communicator 42, and a controller 43. For example, the femtocell wireless base station-associated communicator 41 and wireless communicator 42 are realized by a DSP or FPGA, and the controller 43 is realized by a CPU.

The femtocell wireless base station-associated communicator 41 performs wired or wireless communication with the femtocell wireless base station 11.

The wireless communicator 42 communicates wirelessly with the wireless base stations 18a to 18f. The communication scheme to be employed may be WCDMA, GSM, EDGE, CDMA2001x, LTE, or WiMAX, for example.

Following the instructions from the femtocell wireless base station 11, the controller 43 communicates wirelessly with the wireless base stations 18a to 18f to exchange data therewith.

Figure 5:
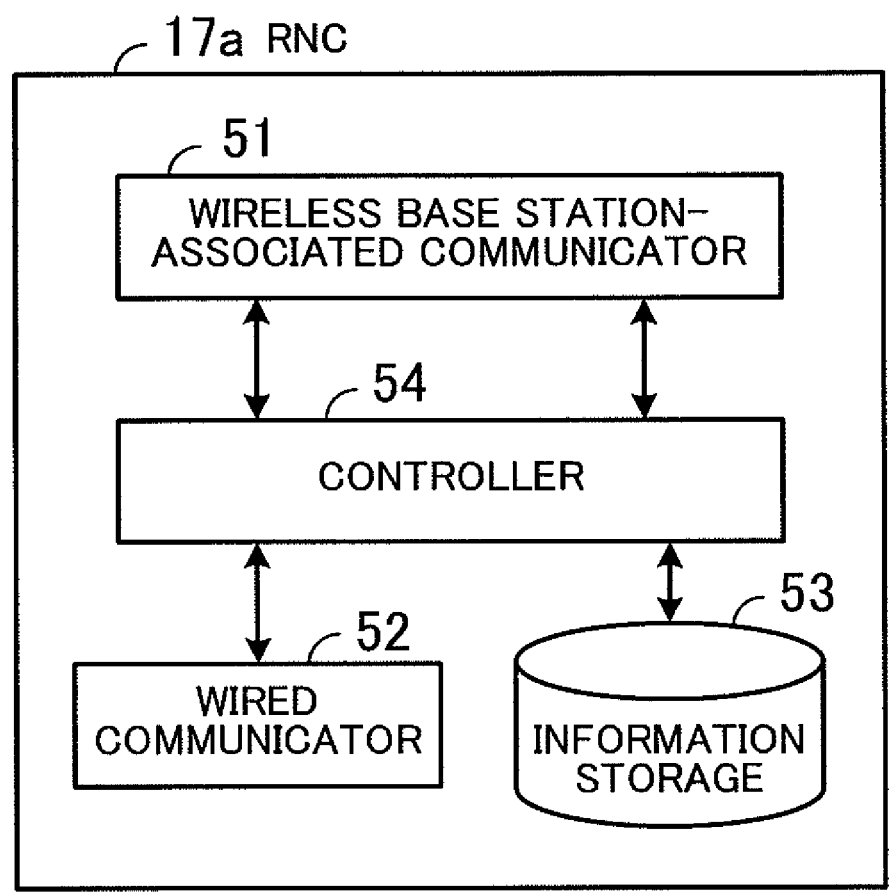
FIG. 5 is a block diagram of an RNC.

FIG. 5 is a block diagram of the RNC. As illustrated in FIG. 5, the RNC 17a comprises a wireless base station-associated communicator 51, a wired communicator 52, an information storage 53, and a controller 54. The RNCs 17b and 17c also have the same configuration as that illustrated in FIG. 5, and therefore, description thereof is omitted. For example, the wireless base station-associated communicator 51 and wired communicator 52 are realized by a DSP or FPGA, and the controller 54 is realized by a CPU.

The wireless base station-associated communicator 51 exchanges data with the wireless base stations 18a and 18b.

The wired communicator 52 transmits and receives data via the public network 13 and the carrier network 16.

The information storage 53 stores the RNC information in advance. Also, the information storage 53 stores the location information about the location of the femtocell wireless base station 11. The information storage 53 includes a memory.

When the installation information is received from the femtocell wireless base station 11 through the wireless base station-associated communicator 51, the controller 54 reads out the RNC information from the information storage 53. After reading out the RNC information, the controller 54 transmits the RNC information to the femtocell wireless base station 11 through the wireless base station-associated communicator 51.

Also, when the installation information is received from the femtocell wireless base station 11, the controller 54 recognizes the installation location of the newly installed femtocell wireless base station 11 on the basis of the location of the wireless base station 18b that relayed the installation information. The respective locations of the wireless base stations 18a and 18b are registered beforehand in the RNC 17a, and therefore, the controller 54 can recognize the location of the wireless base station 18b. By identifying the wireless base station 18a or 18b that relayed the installation information, the controller 54 can recognize the location of the femtocell wireless base station 11. The controller 54 stores the location information about the location of the femtocell wireless base station 11 in the information storage 53 and also transmits the location information to the femtocell wireless base station 11 through the wireless base station-associated communicator 51.

The controller 54 exchanges controller-station data with the femtocell wireless base station 11 via the public network 13, the gateway 15 and the carrier network 16 to establish a controller-station link.

Figure 6:
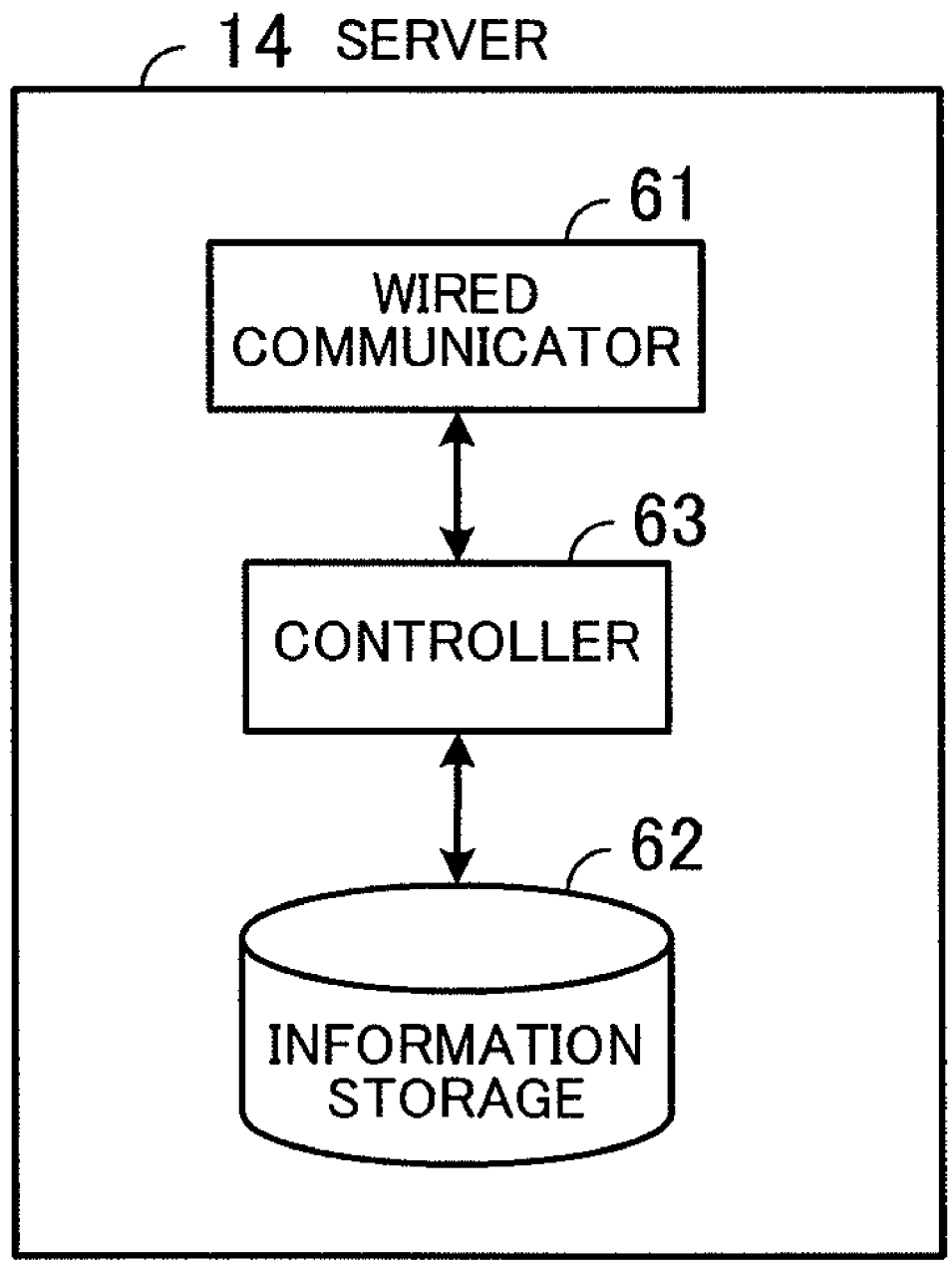
FIG. 6 is a block diagram of a server.

FIG. 6 is a block diagram of the server. As illustrated in FIG. 6, the server 14 comprises a wired communicator 61, an information storage 62, and a controller 63. For example, the wired communicator 61 is realized by a DSP or FPGA, and the controller 63 is realized by a CPU.

The wired communicator 61 transmits and receives data via the public network 13.

Authentication information for authenticating the femtocell wireless base station 11 is stored beforehand in the information storage 62. For example, the identifier of the femtocell wireless base station 11 is stored in advance. The information storage 62 includes a memory.

On receiving the femtocell wireless base station-specific information from the femtocell wireless base station 11, the controller 63 compares the received information with the authentication information stored in the information storage 62. Specifically, the controller compares the identifier included in the femtocell wireless base station-specific information with the identifier included in the authentication information. Then, the controller 63 transmits the authentication result obtained by the comparison, to the femtocell wireless base station 11 through the wired communicator 61.

FIG. 7 illustrates an exemplary data structure of the installation information. In FIG. 7 is illustrated an RRC (Radio Resource Control) CONNECTION REQUEST message used for establishing a radio resource connection. The femtocell wireless base station 11 adds a new code to the Establishment cause in the RRC CONNECTION REQUEST message so that the installation information about the installation of the femtocell wireless base station 11 may be indicated by the added code.

FIG. 8 illustrates codes of the Establishment cause. As illustrated in FIG. 8, the Establishment cause contains a plurality of codes. The femtocell wireless base station 11 newly adds an F-BTS Establishment code, enclosed in the rectangle in FIG. 8, to the Establishment cause in order to indicate the installation information about the installation of the femtocell wireless base station 11.

When the RRC CONNECTION REQUEST message is received, the RNC 17a can recognize by the F-BTS Establishment code included in the Establishment cause that the femtocell wireless base station 11 is being newly installed.

FIG. 9 illustrates an exemplary data structure of the RNC information and the location information. In FIG. 9 is illustrated an RRC CONNECTION REJECT message. The RNC 17a adds a new code to the Rejection cause in the RRC CONNECTION REJECT massage so that the RNC information and the location information may be indicated by the added code.

Figure 10:
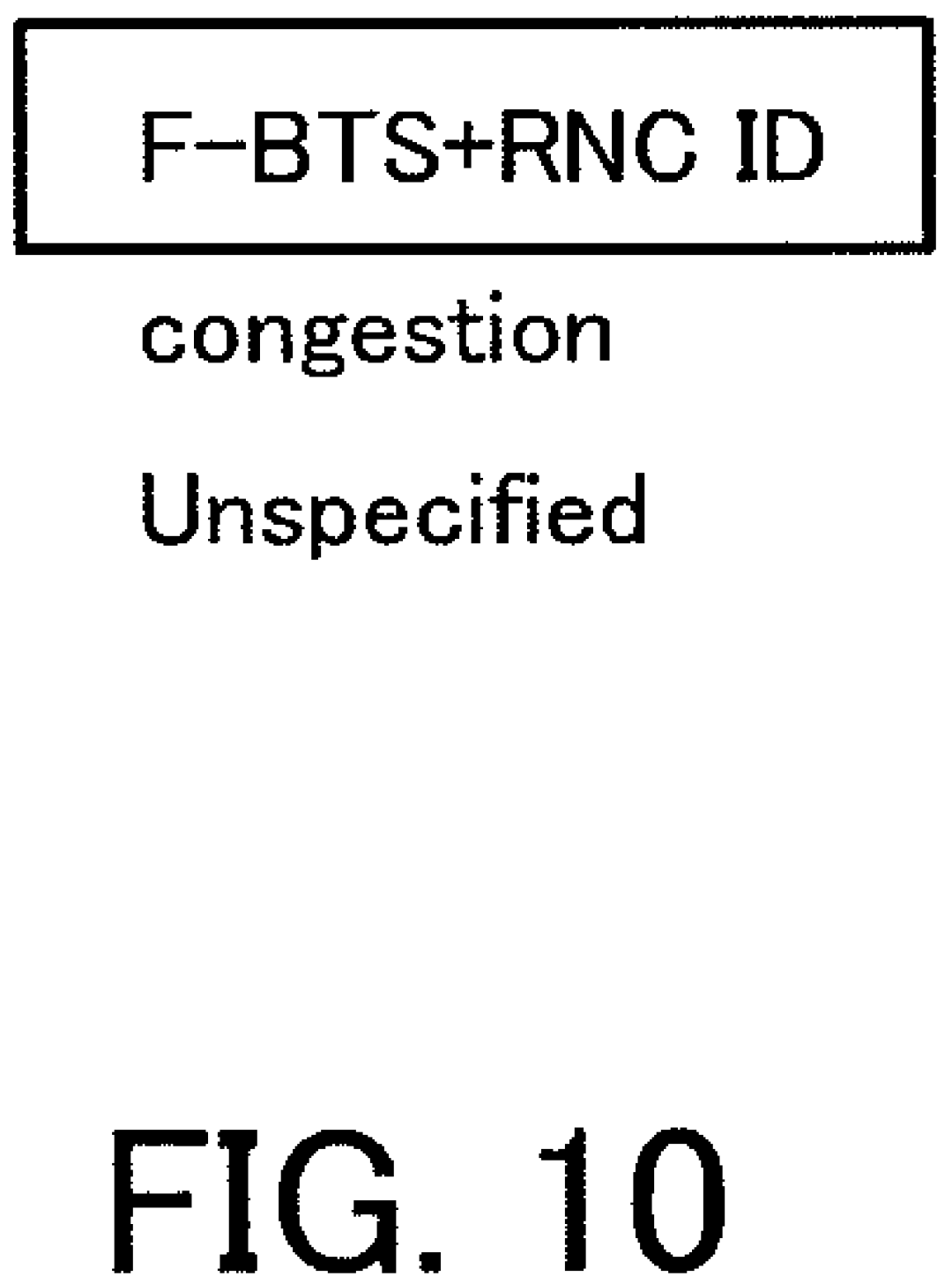

FIG. 10 illustrates codes of the Rejection cause. As illustrated in FIG. 10, the Rejection cause contains a plurality of codes. The RNC 17a newly adds an F-BTS+RNC ID code, enclosed in the rectangle in FIG. 10, to the Rejection cause in order to indicate the RNC information and the location information.

On receiving the RRC CONNECTION REJECT message which is one of responses to the RRC CONNECTION REQUEST message, the femtocell wireless base station 11 can recognize, by the F-BTS+RNC ID code included in the Rejection cause, the location of its own as well as the RNC 17a to connect to.

FIG. 11 is a sequence diagram illustrating processes of the communication network. Specifically, FIG. 11 illustrates a sequence of processes performed by the femtocell wireless base station 11, the wireless terminal 12a, the server 14, the RNC 17a and the wireless base station 18b, all appearing in FIG. 2.

Let it be assumed that, in Step S1, the user connects the femtocell wireless base station 11 to the public network 13 and also connects the wireless terminal 12a to the femtocell wireless base station 11. In this case, the controller 35 of the femtocell wireless base station 11 accesses the server 14 through the wired communicator 32 and the public network 13, and requests authentication. At this time, the controller 35 transmits the femtocell wireless base station-specific information to the server 14.

In Step S2, the controller 63 of the server 14 receives the femtocell wireless base station-specific information from the femtocell wireless base station 11 through the wired communicator 61. On receiving the femtocell wireless base station-specific information, the controller 63 compares the received information with the authentication information stored in the information storage 62. Then, the controller 63 transmits the result of the comparison between the femtocell wireless base station-specific information and the authentication information to the femtocell wireless base station 11 through the wired communicator 61.

In Step S3, the controller 35 of the femtocell wireless base station 11 receives, through the wired communicator 32, the authentication result from the server 14. If the received authentication result indicates success in authentication, the controller 35 proceeds to Step S4, and if the received authentication result indicates failure in authentication, the controller 35 proceeds to Step S1.

In Step S4, the controller 35 of the femtocell wireless base station 11 transmits an RRC CONNECTION REQUEST to the wireless terminal 12a through the wireless terminal-associated communicator 33. As explained above with reference to FIGS. 7 and 8, the RRC CONNECTION REQUEST includes the F-BTS Establishment code indicating that the femtocell wireless base station 11 is being newly installed.

In Step S5, the controller 43 of the wireless terminal 12a receives, through the femtocell wireless base station-associated communicator 41, the RRC CONNECTION REQUEST from the femtocell wireless base station 11. On receiving the RRC CONNECTION REQUEST, the controller 43 transmits the RRC CONNECTION REQUEST wirelessly to the wireless base station 18b through the wireless communicator 42.

In Step S6, the wireless base station 18b receives the RRC CONNECTION REQUEST. The wireless base station 18b forwards the received RRC CONNECTION REQUEST to the RNC 17a that has control over the wireless base station 18b.

In Step S7, the controller 54 of the RNC 17a receives, through the wireless base station-associated communicator 51, the RRC CONNECTION REQUEST from the wireless base station 18b. On receiving the RRC CONNECTION REQUEST, the controller 54 reads out the RNC information from the information storage 53. Also, based on the location of the wireless base station 18b that relayed the RRC CONNECTION REQUEST, the controller 54 recognizes the installation location where the femtocell wireless base station 11 is being newly installed.

In Step S8, the controller 54 generates an RRC CONNECTION REJECT and transmits, through the wireless base station-associated communicator 51, the generated RRC CONNECTION REJECT to the wireless base station 18b. As explained above with reference to FIGS. 9 and 10, the RRC CONNECTION REJECT includes the F-BTS+RNC ID code which holds the RNC information and location information acquired in Step S7.

In Step S9, the wireless base station 18b receives the RRC CONNECTION REJECT from the RNC 17a. The wireless base station 18b then forwards the received RRC CONNECTION REJECT to the wireless terminal 12a.

In Step S10, the controller 43 of the wireless terminal 12a receives, through the wireless communicator 42, the RRC CONNECTION REJECT transmitted from the wireless base station 18b. Then, the controller 43 transmits, through the femtocell wireless base station-associated communicator 41, the received RRC CONNECTION REJECT to the femtocell wireless base station 11.

In Step S11, the controller 35 of the femtocell wireless base station 11 receives, through the wireless terminal-associated communicator 33, the RRC CONNECTION REJECT transmitted from the wireless terminal 12a. Then, the controller 35 stores the RNC information on the RNC 17a and the location information, both included in the received RRC CONNECTION REJECT, in the information storage 34.

In Steps S12a and S12b, the controller 35 of the femtocell wireless base station 11 accesses the RNC 17a through the wired communicator 32 in accordance with the RNC information stored in the information storage 34. The controller 35 of the femtocell wireless base station 11 and the controller 54 of the RNC 17a exchange station-controller data with each other via the public network 13, the gateway 15 and the carrier network 16, to establish a station-controller link.

In Step S13, the femtocell wireless base station 11 and the RNC 17a perform ordinary service. When wireless communication is performed between the wireless communicator 31 of the femtocell wireless base station 11 and the wireless terminal 12b, for example, the femtocell wireless base station 11 transmits and receives data to and from the RNC 17a via the public network 13, the gateway 15 and the carrier network 16.

In this manner, when the femtocell wireless base station 11 is newly installed by the user, the femtocell wireless base station 11 transmits, via the wireless terminal 12a, the RRC CONNECTION REQUEST including the installation information to the RNC 17a which is to control the femtocell wireless base station 11. On receiving the RRC CONNECTION REQUEST from the femtocell wireless base station 11, the RNC 17a transmits the RRC CONNECTION REJECT including the RNC information and the location information to the femtocell wireless base station 11.

Thus, by using the RNC information included in the RRC CONNECTION REJECT, the femtocell wireless base station 11 can connect to the RNC 17a via the public network 13, the gateway 15 and the carrier network 16. Then, the femtocell wireless base station 11 and the RNC 17a exchange station-controller data with each other so that a station-controller link can be established.

The femtocell wireless base station 11 automatically selects and connects to the RNC 17a with which the station-controller link is to be established, and therefore, the user who installs the femtocell wireless base station 11 need not have any special knowledge or follow a particular procedure.

Also, since the femtocell wireless base station 11 is authenticated by the server 14, it is possible to prevent inappropriate femtocell wireless base stations from being incorporated into the network.

In the foregoing description, it is assumed that the femtocell wireless base station 11 communicates wirelessly with the wireless base station 18b via the wireless terminal 12a. Alternatively, the femtocell wireless base station 11 may wirelessly communicate directly with the wireless base station 18b. In this case, the femtocell wireless base station 11 additionally includes the blocks illustrated in FIG. 4.

Also, in the above description, the installation information, the RNC information and the location information are carried by the messages RRC CONNECTION REQUEST and RRC CONNECTION REJECT. As an alternative, new messages separate from these messages may be defined so as to carry the installation information, the RNC information and the location information.

With the wireless base station, wireless network controller and automatic networking method disclosed herein, the wireless base station can automatically connect to the wireless network controller.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A wireless base station to be incorporated into a wireless communication network via a public network, comprising:
   a wireless terminal communicator configured to communicate with a wireless terminal;
   an installation information transmitter configured to transmit, by means of wireless communication with an existing wireless base station via the wireless terminal, installation information indicating that the wireless base station is being installed, to a wireless network controller which controls the existing wireless base station; and
   a connection information receiver configured to receive connection information for connecting to the wireless network controller via the public network, from the wireless network controller by means of wireless commurlication with the existing wireless base station via the wireless terminal.

2. The wireless base station according to claim 1, further comprising a wireless terminal communicator configured to communicate with a wireless terminal, and
   wherein the installation information transmitter and the connection information receiver communicate wirelessly with the existing wireless base station via the wireless terminal.

3. The wireless base station according to claim 1, further comprising a station-controller link establishing unit configured to connect to the wireless network controller in accordance with the connection information received by the connection information receiver and to establish a station-controller link via the public network.

4. The wireless base station according to claim 1, wherein the installation information transmitter transmits the installation information by including the installation information in request information for requesting establishment of radio resource connection.

5. The wireless base station according to claim 1, wherein the connection information is included in response information responsive to request information for requesting establishment of radio resource connection.

6. The wireless base station according to claim 1, further comprising:
   an authentication information transmitter configured to transmit authentication information to a server connected to the public network; and
   an authentication result receiver configured to receive an authentication result from the server.

7. An automatic networking method for a wireless base station which is to be incorporated into a wireless communication network via a public network, comprising:
   communicating with a wireless terminal;
   transmitting, by means of wireless communication with an existing wireless base station via the wireless terminal, installation information indicating that the wireless base station is being installed, to a wireless network controller which controls the existing wireless base station; and
   receiving, by means of wireless communication with the existing wireless base station via the wireless terminal, connection information for connecting to the wireless network controller via the public network, from the wireless network controller.

8. A wireless base station to be incorporated into a wireless communication network via a public network, comprising:
   an installation information transmitter configured to transmit installation information indicating that the wireless base station is being installed, to a gateway which interconnects the public network and an existing wireless base station via a carrier network into which the existing wireless base station is incorporated; and
   a connection information receiver configured to receive connection information for connecting to a wireless network controller via the public network, from the wireless network controller by means of wireless communication with the existing wireless base station.

* * * * *